(12) United States Patent
Low et al.

(10) Patent No.: US 10,750,316 B2
(45) Date of Patent: *Aug. 18, 2020

(54) MATCHING AND TRACKING OF INDIVIDUAL AND MOBILE DEVICE

(71) Applicant: International Business Machines Corporation, Armonk, NY (US)

(72) Inventors: Andrew R. Low, Stittsville (CA); Travis R. Winter, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,076

(22) Filed: Jun. 5, 2019

(65) Prior Publication Data
US 2019/0289424 A1  Sep. 19, 2019

Related U.S. Application Data

(63) Continuation of application No. 15/801,717, filed on Nov. 2, 2017, now Pat. No. 10,382,886, which is a
(Continued)

(51) Int. Cl.
*H04W 24/00* (2009.01)
*H04W 4/021* (2018.01)
(Continued)

(52) U.S. Cl.
CPC ........... *H04W 4/021* (2013.01); *H04L 67/306* (2013.01); *H04B 1/385* (2013.01);
(Continued)

(58) Field of Classification Search
None
See application file for complete search history.

(56) References Cited

U.S. PATENT DOCUMENTS 7,327,262 B2   2/2008   Motteram et al.
7,737,861 B2   6/2010   Lea et al.
(Continued)

FOREIGN PATENT DOCUMENTS

CN   102353934 A   2/2012

OTHER PUBLICATIONS

Jessica Plautz, "How your phone could help speed you through New York City's busiest airport", http://mashable.com/2015/08/05/jfk-terminal-4/#YvdmzyFqTaqq, Aug. 5, 2015, 13 pages.
(Continued)

*Primary Examiner* — Khalid W Shaheed
(74) *Attorney, Agent, or Firm* — William H. Hartwell; Maxine L. Barasch; Keohane & D'Alessandro PLLC (57) ABSTRACT

Disclosed embodiments provide systems, methods, and computer program products for associating mobile devices with identities of individuals, and tracking such individuals using the location of respective devices. Initially, a user registration process is performed to register an individual for a tracking list. A unique identifier is wirelessly detected from a mobile device in proximity to the individual. The unique identifier is added to the tracking list. The location of the mobile device within the venue is tracked using the unique identifier. When the individual exits the venue, the departure is recorded, and the unique identifier is removed from the tracking list.

17 Claims, 7 Drawing Sheets

| Passenger (702) | UUID List (704) | Locations (706) | Score (708) |
|---|---|---|---|
| John Smith (710) | A8_81_95_6A_96_E5 | 2 | 11 |
| Jane Doe (712) | C2_23_95_6C_78_E5<br>33:24:5A:61:23:19 | 4 | 22 |
| William Magoo (714) | C2_23_95_6C_78_E5<br>33:24:5A:61:23:19<br>2A:28:3A:83:46:0A | 4 | 29 |

700

Related U.S. Application Data continuation of application No. 15/397,182, filed on Jan. 3, 2017, now Pat. No. 9,894,477.

(51) Int. Cl.
  *H04L 29/08* (2006.01)
  *H04L 29/12* (2006.01)
  *H04W 88/02* (2009.01)
  *H04B 1/3827* (2015.01)
  *H04W 4/80* (2018.01)
  *H04W 4/029* (2018.01)

(52) U.S. Cl.
  CPC ......... *H04L 61/6022* (2013.01); *H04W 4/029* (2018.02); *H04W 4/80* (2018.02); *H04W 88/02* (2013.01)

(56) References Cited

U.S. PATENT DOCUMENTS

| | | | |
|---|---|---|---|
| 9,894,477 B1* | 2/2018 | Low | H04W 4/021 |
| 2005/0128989 A1 | 6/2005 | Bhagwat et al. | |
| 2005/0288937 A1 | 12/2005 | Verdiramo | |
| 2007/0167175 A1 | 7/2007 | Wong et al. | |
| 2014/0176328 A1 | 6/2014 | Koushik | |
| 2014/0248901 A1* | 9/2014 | Johnsson | H04W 64/00 455/456.1 |
| 2015/0227851 A1* | 8/2015 | Kaisser | H04W 4/21 706/12 |
| 2015/0339912 A1 | 11/2015 | Farrand et al. | |
| 2015/0365787 A1 | 12/2015 | Farrell | |
| 2016/0080390 A1 | 3/2016 | Kalb et al. | |
| 2016/0189132 A1 | 6/2016 | Cash et al. | |
| 2016/0316503 A1 | 10/2016 | Raphael | |
| 2017/0302750 A1 | 10/2017 | Greenberger | |
| 2018/0192238 A1* | 7/2018 | Low | H04W 4/021 |

OTHER PUBLICATIONS

Julianne Pepitone, "Long Lines at JFK? Airport Now Tracks Phones to Find Out", http://www.nbcnews.com/tech/mobile/jfk-airport-shows-wait-times-n413171, Aug. 20, 2015, 3 pages.

Aarian Marshall, Citylab, "NYC's Smartphone-Tracking Phone Booths Do Not Mark the Data Privacy Apocalypse", http://www.citylab.com/tech/2014/10/nycs-smartphone-tracking-phone-b . . . , Oct. 6, 2014, 4 pages.

"Austin Airport Tracks Cell Phones to Measure Security Line Wait", https://yro.slashdot.org/story/14/10/23/1626204/austin-airport-tracks-cell . . . , Oct. 23, 2014, 17 pages.

Shaheed, Khalid W., U.S. Appl. No. 15/397,182, Office Action dated Apr. 7, 2017, 21 pgs.

Shaheed, Khalid W., U.S. Appl. No. 15/397,182, Notice of Allowance dated Sep. 21, 2017, 8 pgs.

Shaheed, Khalid W., U.S. Appl. No. 15/801,717, Office Action dated Jun. 11, 2018, 25 pgs.

Shaheed, Khalid W., U.S. Appl. No. 15/801,717, Final Office Action dated Dec. 31, 2018, 14 pgs.

Shaheed, Khalid W., U.S. Appl. No. 15/801,717, Notice of Allowance dated Mar. 15, 2019, 9 pgs.

* cited by examiner

| Passenger | UUID List | Locations | Score |
|---|---|---|---|
| John Smith | A8_81_95_6A_96_E5 | 2 | 11 |
| Jane Doe | C2_23_95_6C_78_E5<br>33:24:5A:61:23:19 | 4 | 22 |
| William Magoo | C2_23_95_6C_78_E5<br>33:24:5A:61:23:19<br>2A:28:3A:83:46:0A | 4 | 29 |

FIG. 7

MATCHING AND TRACKING OF INDIVIDUAL AND MOBILE DEVICE

RELATED U.S. APPLICATION DATA

The present patent document is a continuation of U.S. patent application Ser. No. 15/801,717, filed Nov. 2, 2017 and U.S. patent application Ser. No. 15/397,182, filed Jan. 3, 2017, now U.S. Pat. No. 9,894,477, issued Feb. 13, 2018, both entitled "MATCHING AND TRACKING OF INDIVIDUAL AND MOBILE DEVICE". The entire contents of U.S. patent application Ser. No. 15/801,717 and U.S. patent application Ser. No. 15/397,182 are incorporated herein by reference.

FIELD OF THE INVENTION

The present invention relates generally to mobile device detection and tracking.

BACKGROUND

Public venues, for example, airports, can be very large. Passengers of various flights may walk through several terminals, or look around to shop or eat before or after a flight. In some instances, it is desirable to be able to track the location of various individuals in a large venue. Typically, to let a passenger know that the plane door is closing, an announcement is typically made over a loudspeaker throughout the airport. This is inefficient as no whereabouts of the passenger is conveyed in response. Some people do not pay attention to the loud speaker, or fail to hear their name, making the announcement inadequate. There exists a need for better systems of delivering messages to people in large venues.

SUMMARY

Disclosed embodiments provide systems, methods, and computer program products for associating mobile devices with identities of individuals and tracking such individuals using the location of respective devices. Initially, a user registration process is performed to register an individual for a tracking list. A unique identifier is wirelessly detected from a mobile device in proximity to the individual. The user and the unique identifier are associated with one another. The unique identifier is added to the tracking list. The location of the mobile device within the venue is tracked using the unique identifier. When the individual exits the venue, the departure is recorded, and the unique identifier is removed from the tracking list. Embodiments improve ability to communicate messages to individuals in a venue, and also enhance security.

In one aspect, embodiments provide a computer-implemented method for automatic tracking of a user within a venue, comprising performing, in response to the user entering an entry checkpoint for the venue, a user registration process to register the user for tracking; wirelessly detecting a unique identifier from a first mobile device in proximity to the user; associating the user and the unique identifier with one another; tracking a location of the first mobile device within the venue; and in response to the user passing through an exit checkpoint for the venue, disassociating the user and the unique identifier.

In another aspect, embodiments provide a device comprising a processor; a memory coupled to the processor; a network interface coupled to the processor; wherein the memory contains instructions, which when executed by the processor, perform the steps of: performing, in response to the user entering an entry checkpoint for a venue, a user registration process to register a user for tracking; wirelessly detecting a unique identifier from a first mobile device in proximity to the user; associating the user and the unique identifier with one another; tracking a location of the first mobile device within the venue; and in response to the user passing through an exit checkpoint for the venue, disassociating the user and the unique identifier.

In yet another aspect, embodiments provide a computer program product for an electronic device for automatic tracking of a user within a venue, comprising a computer readable storage medium having program instructions embodied therewith, the program instructions executable by a processor to cause the electronic device to: perform, in response to the user entering an entry checkpoint for the venue, a user registration process to register the user for tracking; wirelessly detect a unique identifier from a first mobile device in proximity to the user; associate the user and the unique identifier with one another; track a location of the first mobile device within the venue; and in response to the user passing through an exit checkpoint for the venue disassociate the user and the unique identifier.

BRIEF DESCRIPTION OF THE DRAWINGS

Features of the disclosed embodiments will be more readily understood from the following detailed description of the various aspects of the disclosure taken in conjunction with the accompanying drawings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide systems, methods, and computer program products for automatic tracking of a user within a venue. Disclosed methods include associating mobile devices with identities of individuals, and tracking such individuals using the location of respective devices. Initially, a user registration process is performed to register an individual for tracking within the venue. A unique identifier is wirelessly detected from a mobile device in proximity to the individual at approximately the same time the registration takes place. The unique identifier is added to the tracking list. In embodiments, the tracking list is used to associate the user and the unique identifier with one another. The location of the mobile device within the venue is tracked using the unique identifier. When the individual exits the venue, the departure is recorded, and the unique identifier is removed from the tracking list. Embodiments improve ability to communicate messages to individuals in a venue and also enhance security. For example, in a venue such as an airport, embodiments can speed up departure schedules, allowing airlines to be proactive in getting customers to the appropriate gate at the appropriate time.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

Figure 1:
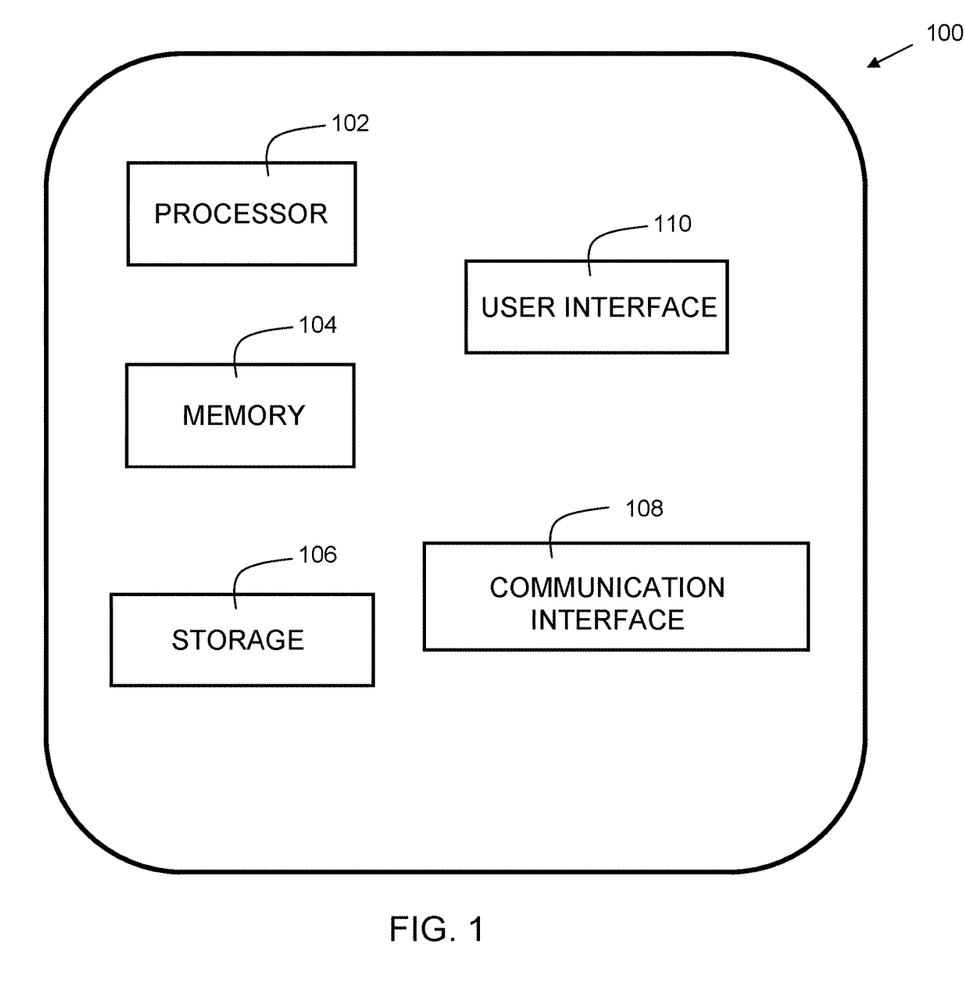
FIG. 1 is a block diagram of a device in accordance with embodiments of the present invention.

FIG. 1 is a system block diagram of a device 100 for executing steps of embodiments of the present invention. Device 100 is shown as a simplified diagram of modules. Device 100 is an electronic computing device. It may be a mobile device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Memory 104 includes instructions, which when executed by the processor, implement steps of the present invention.

Device 100 further includes storage 106. In embodiments, storage 106 may include one or more magnetic storage devices such as hard disk drives (HDDs). Storage 106 may additionally include one or more solid state drives (SSDs).

The memory 104 and storage 106 together provide memory for one or more applications to execute on processor 102. In embodiments, device 100 may have multiple processors 102, and/or multiple cores per processor.

Device 100 further includes a user interface 110, examples of which include a liquid crystal display (LCD), a plasma display, a cathode ray tube (CRT) display, a light emitting diode (LED) display, an organic LED (OLED) display, or other suitable display technology. The user interface 110 may further include a keyboard, mouse, and/or a touch screen, incorporating a capacitive or resistive touch screen in some embodiments.

The device 100 further includes a communication interface 108. In embodiments, the communication interface 108 may include a wireless communication interface that includes modulators, demodulators, and antennas for a variety of wireless protocols including, but not limited to, Bluetooth™, Wi-Fi, and/or cellular communication protocols for communication over a computer network.

Figure 2:
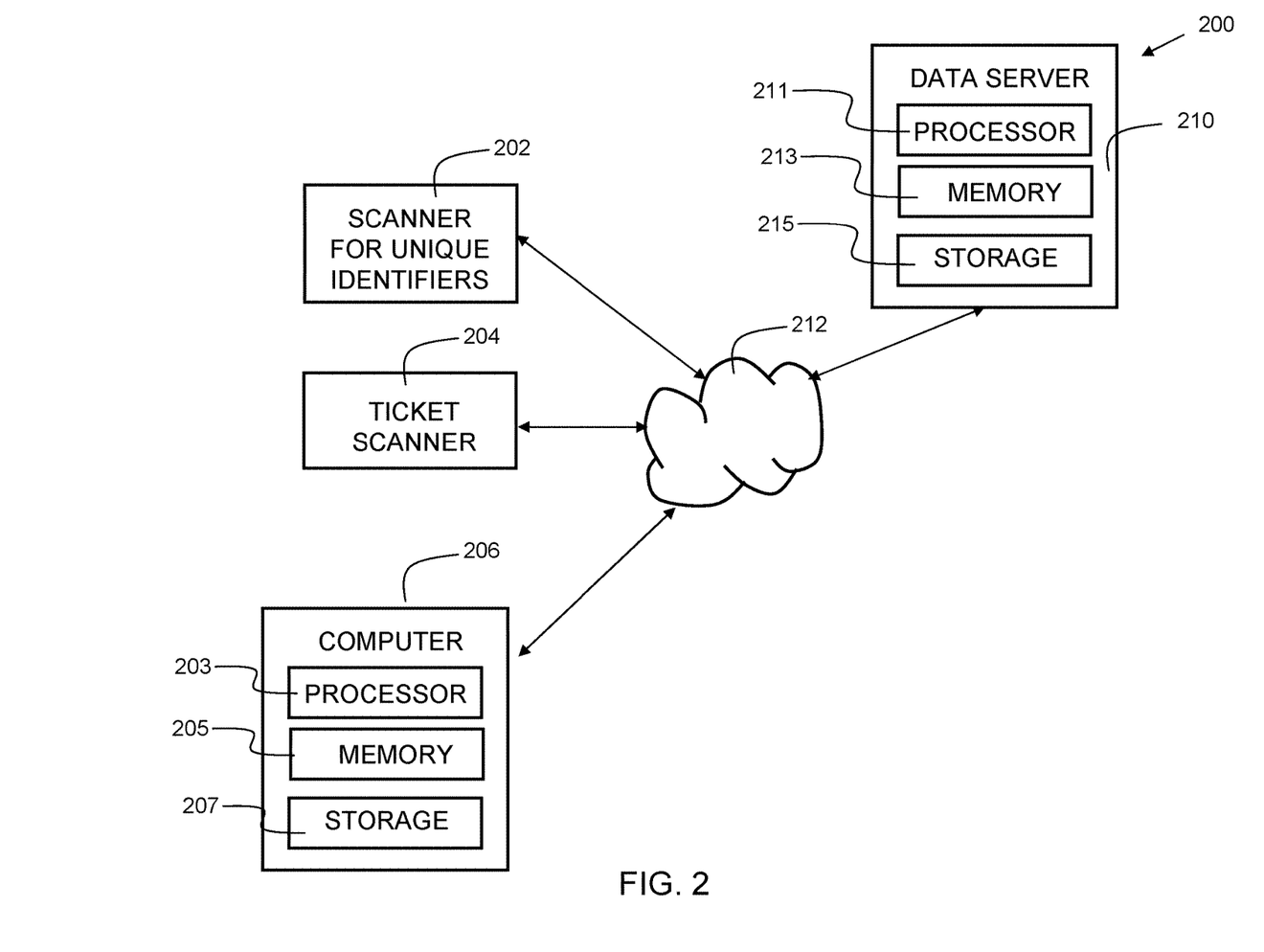
FIG. 2 is a diagram of a checkpoint in accordance with embodiments of the invention.

FIG. 2 is a diagram 200 of examples of components of a checkpoint for performing a user registration process in accordance with embodiments of the present invention. In the example, the checkpoint is a security checkpoint of an airport. Typically, when taking a commercial flight, passengers must pass through such a checkpoint to get to the terminal where the flight gates are. At the checkpoint, passengers' boarding passes/tickets are scanned, their identification is checked to match the name on the ticket, and their person and carry-on luggage is passed through a security screening device for metal, explosives, and other dangerous items.

Diagram 200 shows examples of components at such a checkpoint for implementation of embodiments of the invention. Computer 206, including a processor 203, memory 205, and storage 207, may be operated by checkpoint attendant to utilize the ticket/boarding pass scanner 204, unique identifier scanner 202, and interface with the data server 210. Data server 210, similar to computing device 100 (of FIG. 1) includes a processor 211, memory 213, and storage 215, for implementing steps of embodiments of the invention. A ticket/boarding pass scanner 204 may include an RFID scanner, barcode scanner, quick response code scanner, or scanner of other identifier of a passenger's ticket/boarding pass. Scanner 202 scans for a unique identifier emitted from mobile devices. This unique identifier may be an Ethernet MAC address, a Bluetooth address, or a UUID (from a Bluetooth Low Energy beacon), etc. The mobile device may be a smartphone, a wearable fitness monitor, a tablet computer, or other suitable device. Scanned and detected data is sent from the computer 206 to data server 210 for association and processing. In embodiments, the unique identifiers that are detected by scanner 202 at about the same time as a passenger ticket is scanned with ticket scanner 204 are associated with each other by the data server 210. Each of the components is in communication with one another via a network 212, which may be the Internet, a wide area network, a local area network, a combination thereof, and/or any other suitable network.

Figure 3:
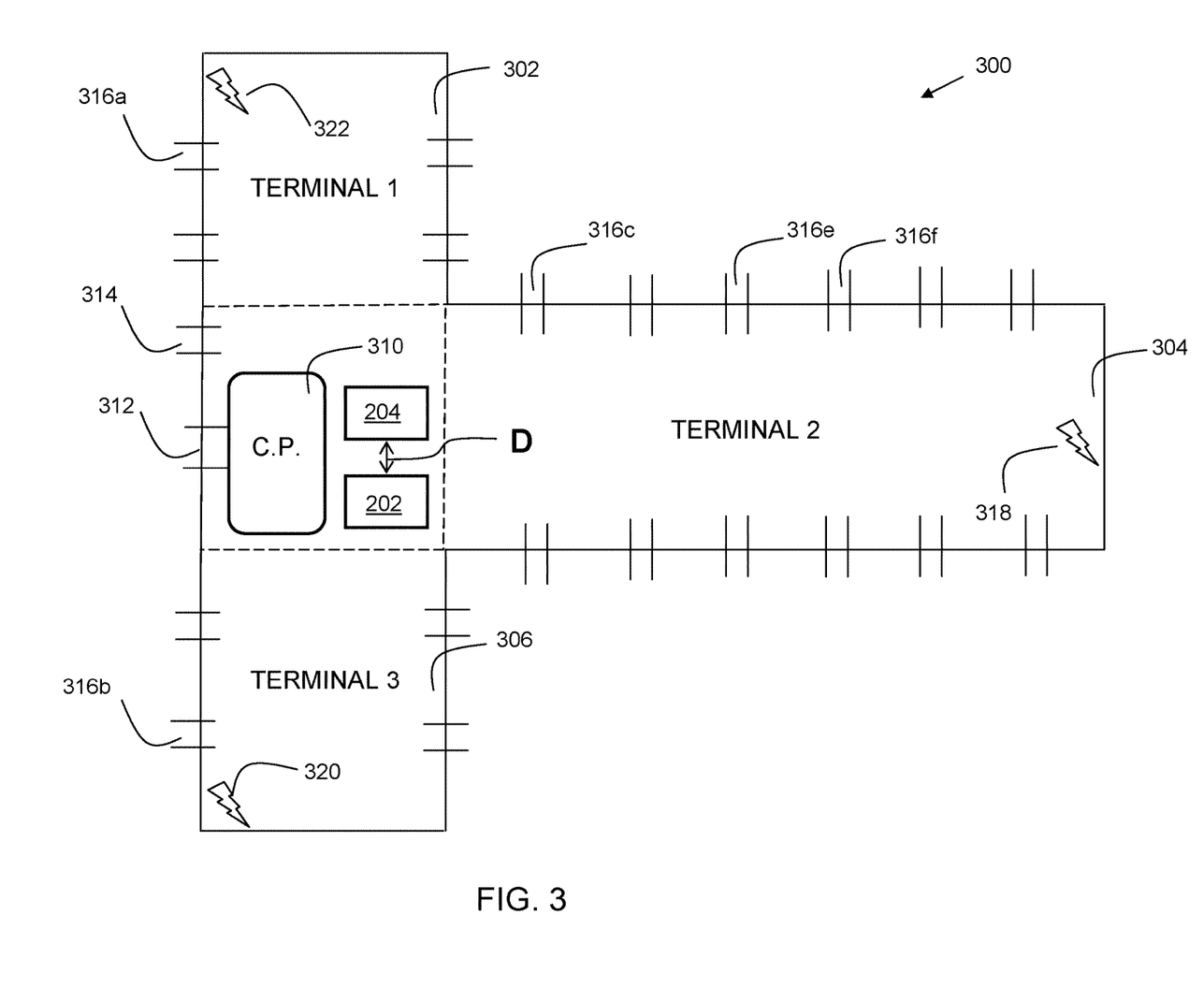
FIG. 3 is a diagram of a venue in accordance with embodiments of the invention.

FIG. 3 is a diagram 300 of a venue in accordance with embodiments of the invention. In the example, the venue is an airport. The airport has 3 terminals—Terminal 1 302, Terminal 2 304, and Terminal 3 306. Entry 312 leads to security checkpoint 310. The security checkpoint 310 includes a ticket scanner 204 and a unique identifier scanner 202, separated by a distance D. In embodiments, the physical layout of the system is such that the ticket scanner 204 and the unique identifier scanner 202 are placed within close proximity to each other. In some embodiments, the ticket scanner 204 and unique identifier scanner 202 are placed at a distance from each other ranging from one foot to three feet. The close proximity between these devices increases the probability of an accurate association between the ticket that is scanned and the unique identifiers that are detected from unique identifier scanner 202. In other embodiments, the design of the unique identifier scanner 202 is such that it only detects unique identifiers in a specific area. This may be accomplished with antenna design, shielding, and/or signal processing algorithms.

A main exit is shown at 314 for arriving passengers. Gate exits, examples of which are pointed out as reference numbers 316*a*-316*f*, are doors to airplane jet bridges. In the example, there are three scanners 318, 320, and 322. In embodiments, the scanners may be configured to detect WiFi beacons, Bluetooth® beacons, and/or any other suitable beacons or other radio frequency transmissions that broadcast the UUID of the user's device. Although there are three scanners shown in the example, in implementations, there may be more than three. Embodiments may utilize a received signal strength indication (RSSI) to infer a location within the venue.

When a person walks into the airport through entry 312, s/he must pass through security checkpoint 310. At the checkpoint, a registration process is performed. The user must show ID to the attendant and have his/her boarding pass scanned. As the boarding pass is scanned by a ticket scanner (such as 204 of FIG. 2), a device (such as 202 of FIG. 2) detects a unique identifier from a signal emitted from a mobile device carried with or on the person. Embodiments associate the unique identifier with an identity of the person based on detection of the unique identifier at about the same time as the person's ticket/boarding pass is scanned (which contains identifying information for the individual). The unique identifier is added to a tracking list to track the person's whereabouts at the airport.

Figure 4:
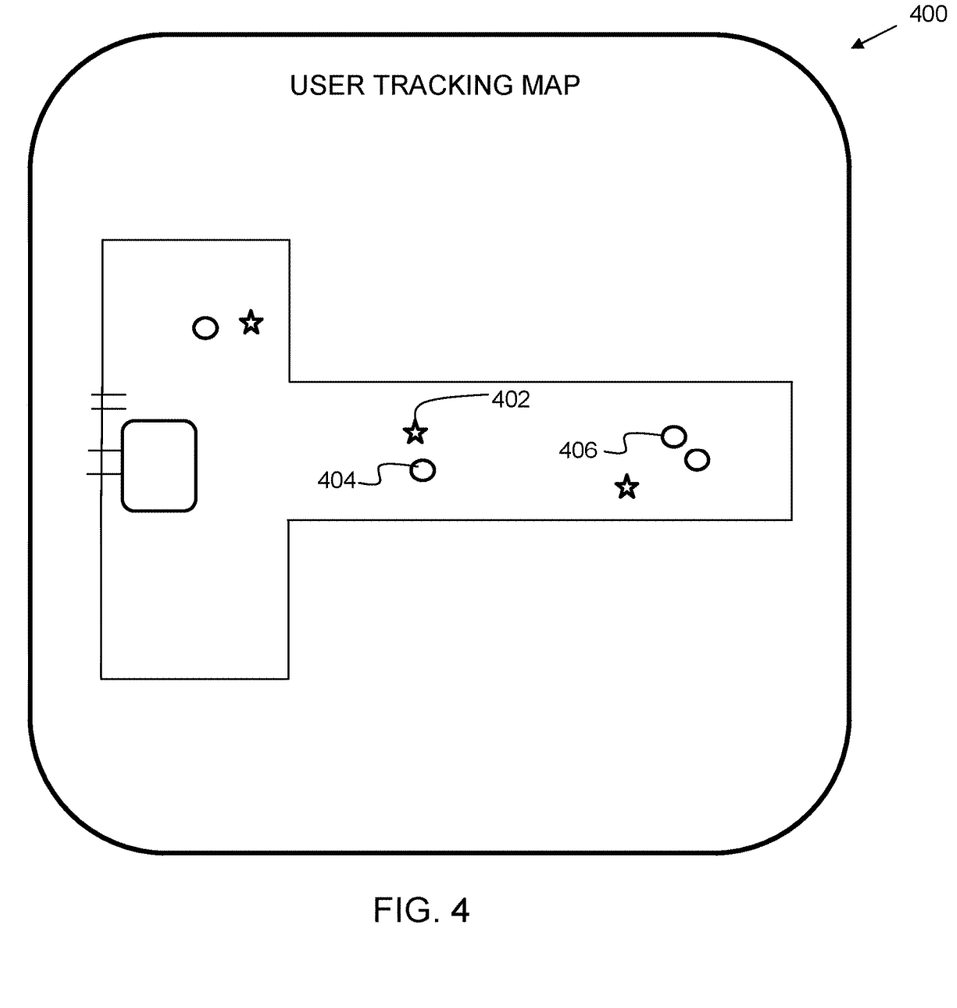
FIG. 4 is a user interface for tracking in accordance with embodiments of the present invention.

FIG. 4 is a user interface 400 for tracking in accordance with embodiments of the present invention. Star 402 shows a high probability point that the passenger associated with a particular unique identifier is in the vicinity. Circles 404 and 406 show lower probability points that the passenger associated with the particular unique identifier is in the vicinity. The association score is calculated based on a level of confidence based on a detected radio frequency signal from the passenger's mobile device.

In some cases, at the time of the registration process, a second unique identifier is wirelessly detected from a second mobile device. For example, the person may be carrying two devices, such as a smartphone and a tablet computer. Embodiments track the location of the first mobile device and the second mobile device within the venue. An association score is calculated based on the tracking of the first mobile device and the second mobile device. The association score accounts for the possibility of error. For example, the second mobile device may actually have been carried by another nearby person and erroneously associated with the wrong person. Another possibility is that the signals of the first mobile device and the second mobile device were properly associated with an individual, but as the individual is with his daughter, he decides at some point in the terminal to hand off his phone to her. This may create some distance between the first mobile device and the second mobile device, reducing the confidence level of the inference that the person (associated with both devices) is actually at the tracked location.

When the individual exits the venue, through, for example a door 316*a* (FIG. 3), it is detected that the person is no longer checked in, so the associated unique identifier is removed from the tracking list. This may occur when the user scans a boarding pass just prior to entering the flight gateway. This can trigger the user being removed from the tracking list, thereby disassociating the user and the unique identifier.

Tracking a known individual is useful as it can ensure that individuals can be contacted at a given time. In the case of an airport, users who are late for departure can be found quickly. Additionally, with infrastructure, localized announcements can be made to lower noise pollution throughout the building, and advertisements can be shown on video screens based on known user information as they walk by them. If an individual is found in a location where they should not be, or are in a "high traffic" area without moving for some time, it could also be used to identify possible security concerns.

In an example use case, a passenger has gone through the security checkpoint at an airport and his flight is about to depart. Upon final check, it is discovered by the gate attendant that the passenger has not boarded the plane. The attendant could search for the passenger in the computer system and discover that the passenger is in a restroom or another terminal based on information on a user interface (FIG. 4) derived from the tracking list. This would allow the attendant to either make a localized vocal announcement in the vicinity of the passenger or send someone to retrieve the passenger.

In another example, the venue is, rather than an airport, a convention location, such as a hotel. Jane Doe returns home from the conference and tries to remember what sessions she attended. When the user checked in to the conference at the check-in desk, her ticket was scanned, for example, by a bar code scanner (such as 204 of FIG. 2), and an RF scanner detected a unique radio frequency of a mobile device. The unique identifier and identity of the person were matched. The unique identifier was added to a tracking list. Scanners were set up in the doorways of the conference rooms at the hotel, so that people entering and exiting the various rooms could be detected. Accordingly, embodiments matched the identity of Jane Doe with her smartphone when she first checked in. Signing into the conference website, she is able to locate from the system memory, the date, time and rooms where she was during the week along with the sessions that were available in those rooms at those times. This is according to some embodiments, where although a user has exited a venue, the tracking data may remain stored in memory for a period of time.

Figure 5:
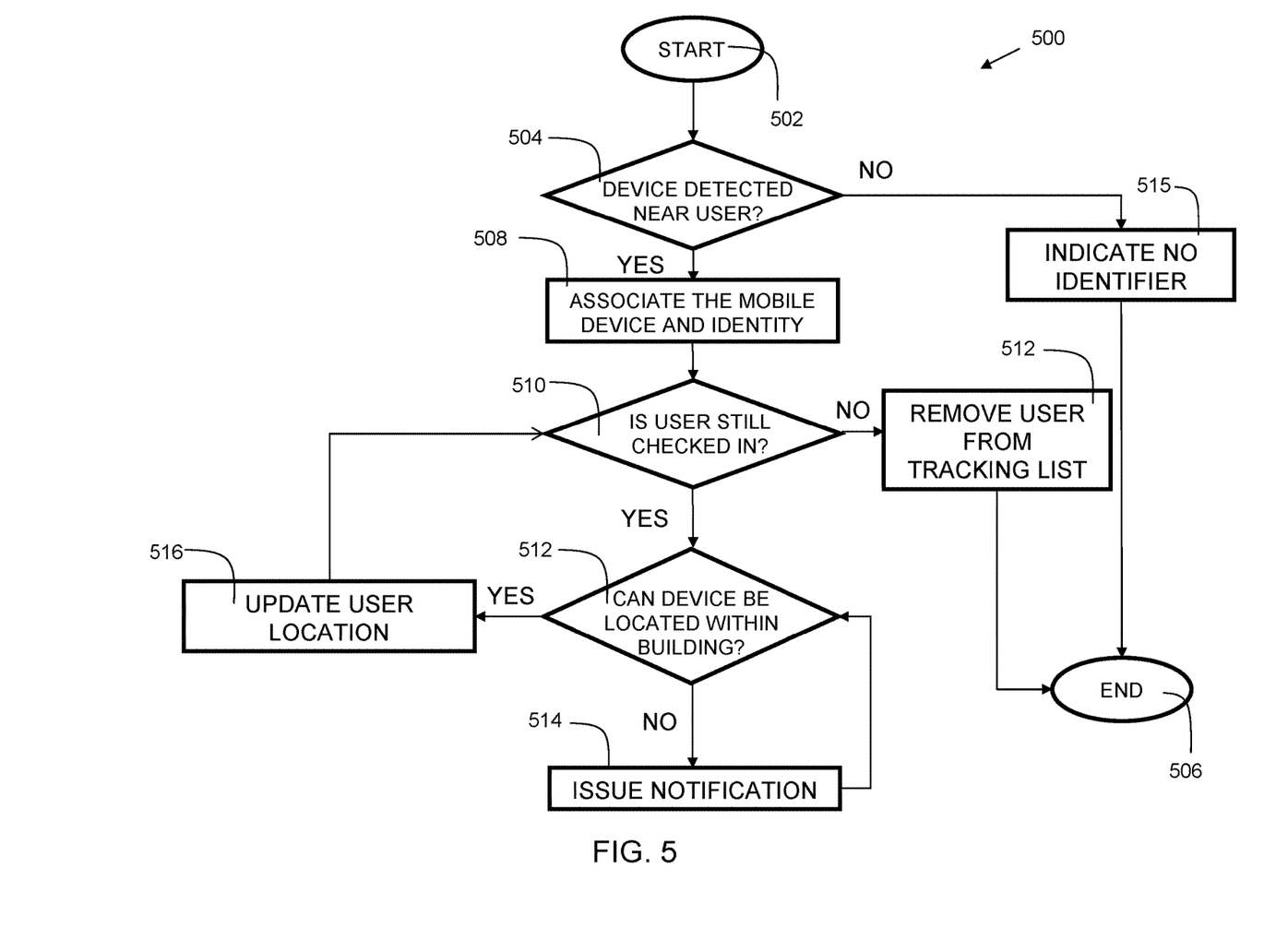
FIG. 5 is a flowchart in accordance with embodiments of the invention.

FIG. 5 is a flowchart 500 for embodiments of the present invention. The process is started, at 502. As an individual checks in at a checkpoint, and during a user registration process, it is determined whether a mobile device is detected near the person, at 504. If not, the process continues to 515, where it is indicated that for that individual, no unique identifier has been found. This indication may be recorded in the tracking list as an empty UUID list within the tracking list. This is useful for situations where an individual does not have a device that is currently broadcasting UUIDs. For example, they may not have a device, or it may be powered off. In these cases, the location of these individuals can be performed by the standard methods of widespread paging throughout the venue. From 515, the process then ends, at 506. If yes, a unique identifier of the mobile device is associated with the identity of the individual and added to the tracking list, at 508. Next, it is determined whether the individual is still checked in (i.e., has the person exited the venue?), at 510. If not, the status is updated (departure recorded), and the unique identifier is removed from the tracking list, at 512, and the process ends, at 506. If it is determined that the user is still checked in, at 510, then it is determined whether the device can be located within the venue, at 512. If not, a notification is issued at 514. The notification can include an email or text message. Such a condition can occur if the individual powers off the device, or the device battery exhausts while in the venue. It is not necessarily a security concern. However, if the individual is "missing" (e.g., does not appear at the flight gate for departure), then a notification can be sent to airline personnel and/or airport security to alert them to the condition. The process may then return to 512, to continue to check for the presence of the unique identifier. This can accommodate a situation where the individual walks through a "dead zone" where reception of the unique identifier is blocked. Furthermore, in the case of battery exhaustion, a user may find an electrical outlet for charging, and thus be able to resume transmission of unique identifiers. If yes at 512, the user's location is updated, at 516, and the process proceeds back to 510.

Figure 6:
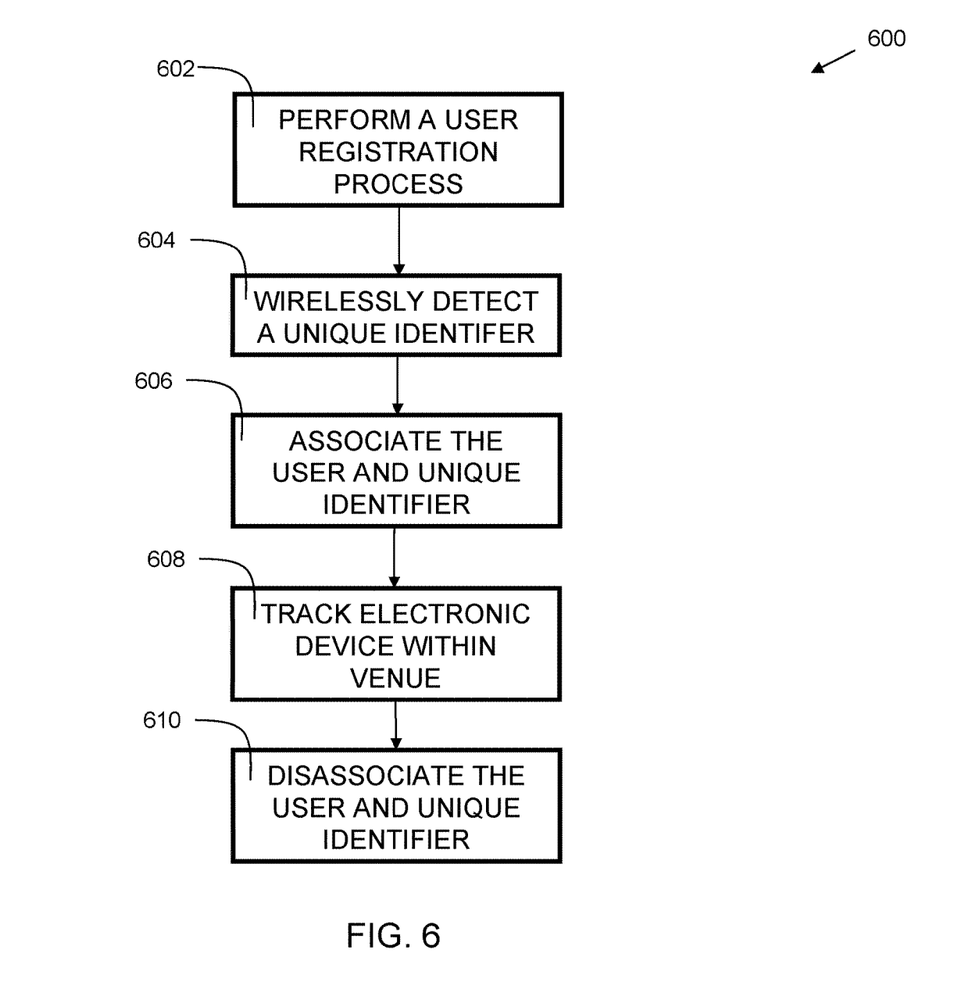
FIG. 6 is another flowchart for embodiments of the present invention.

FIG. 6 is another flowchart 600 for embodiments of the present invention. At 602, a user registration process is performed to register the user for a tracking list, in response to the user entering an entry checkpoint for the venue. A unique identifier is wirelessly detected from a mobile device in proximity to the user, at 604. In embodiments, the unique identifier is wirelessly detected from a mobile device in proximity to the individual at approximately the same time the registration takes place. In some embodiments, a predetermined threshold for association may be established. In some embodiments, the predetermined threshold is ten seconds. Thus, in some embodiments, a unique identifier detected within +/− ten seconds of the registration is associated with the user. The unique identifier is associated with the user, at 606. This can include adding the unique identifier(s) to the tracking list. The location of the mobile device within the venue is tracked, at 608. At 610, when a user exits the venue, the departure is recorded, and the user and unique identifier are disassociated. In some embodiments, the departure may be inferred based on no longer detecting the mobile device inside of the venue, i.e. no broadcast of the UUID is detected. In some embodiments, departure may be recorded by a scanner scanning the unique identifier of a user's boarding pass as s/he exits through door 316a, for example, to board a plane. In embodiments, the disassociation is performed by removing the user and/or unique identifier(s) from the tracking list.

Figure 7:
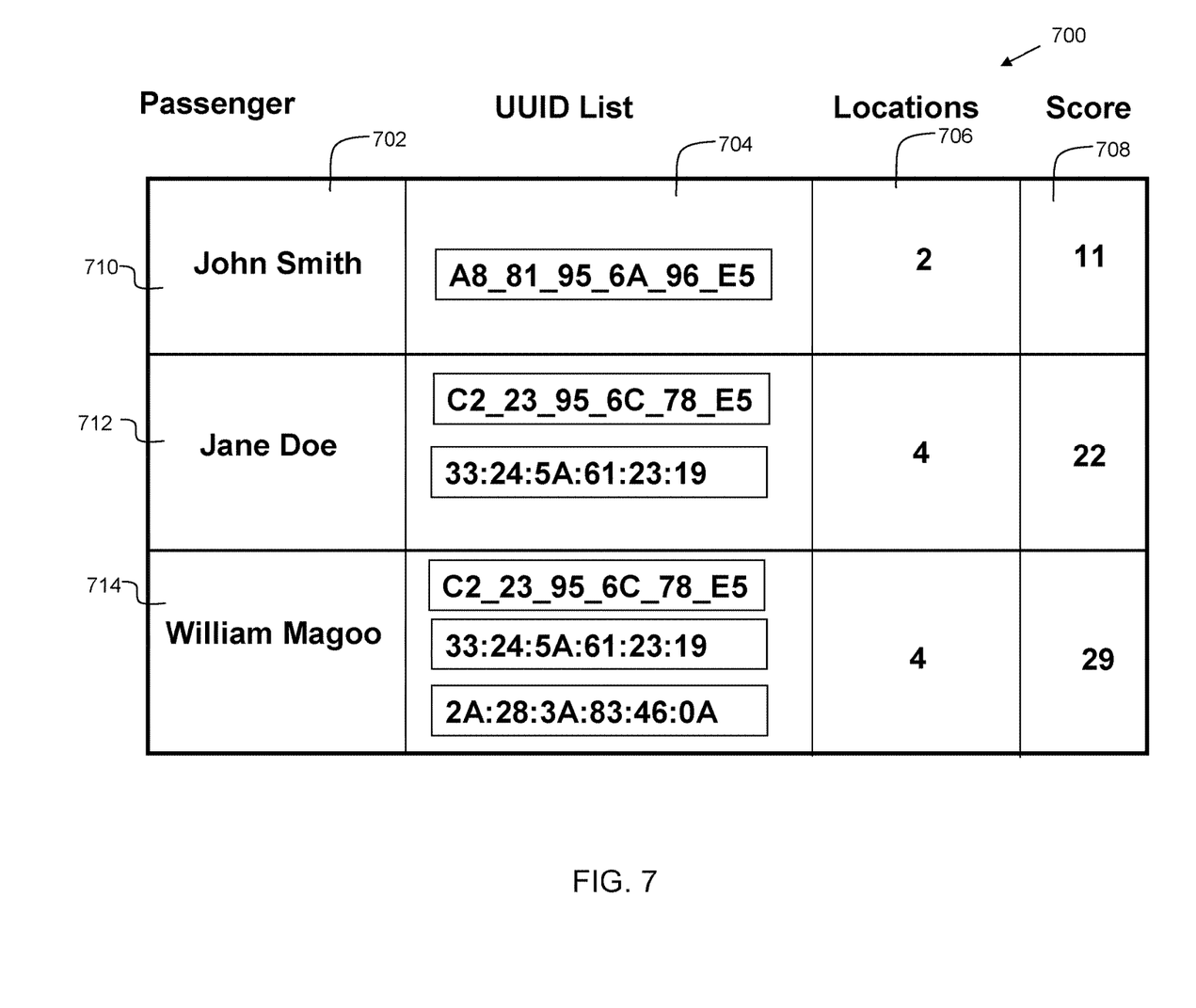
FIG. 7 shows an exemplary tracking list.

FIG. 7 shows an exemplary tracking list 700. Column 702 shows passenger names. Rows 710, 712, and 714 are passenger names to which the corresponding information in the columns are associated. Column 704 shows a UUID list corresponding to each passenger in column 702. The UUID list can contain Bluetooth® addresses, MAC addresses, and/or other unique codes or identifiers. Column 706 indicates a number of locations within the venue where the UUID(s) have been tracked. In embodiments, for each scanner (e.g., 316 of FIG. 3) that detects a UUID, the location count in column 706 is incremented. In embodiments, an association score is computed and stored in column 708. Thus, some embodiments include at the time of the registration process, wirelessly detecting a second unique identifier from a second mobile device, tracking the location of the second mobile device within the venue, and computing an association score based on the tracking of the first mobile device and the second mobile device. In the example shown, the passenger at row 714 has three UUIDs in his corresponding UUID list. In such a scenario, the first UUID may be a Bluetooth address from a smartphone, the second UUID may be a MAC address from a tablet, and the third UUID may be a MAC address from a wearable fitness monitor.

In embodiments, the tracking list 700 is implemented as one or more Structured Query Language (SQL) tables in a database. In embodiments, the score is computed as a function of the number of items in the UUID list for a given passenger, as well as the number of locations for which the UUID(s) have been tracked. In embodiments, the score S is computed as:

$$S = K1(U) + K2(L)$$

Where U is the number of UUIDs associated with a given passenger, and L is the number of locations for which the set of UUIDs associated with the passenger have been tracked. For example, when K1=7 and K2=2, then the score for the passenger in row 710 is 11, the score for the passenger in row 712 is 22, and the score for the passenger in row 714 is 29. In embodiments, passengers with a score above a predetermined threshold can be rendered with a different symbol than those at or below the threshold. For example, if the threshold is set to 20, then referring again to FIG. 4, the passenger in row 710 is rendered as a circle (e.g., 404) while the passengers in rows 712 and 714 would be rendered as a star, such as shown at 402. When multiple devices (e.g., a phone along with a fitness monitor) track to multiple locations within the venue, there is a higher probability that those devices belong to the same person. Thus, embodiments compute the association score based on a number of unique identifiers associated with the user. The score, as shown in column 708 and rendered symbolically in FIG. 4, can be a useful tool in crowd management. For example, if an airline needs to make a gate change, airline personnel can easily see where a number of their passengers currently are, and select an available gate that is closest to that group of people. Other applications and uses are possible. There is no need for a special "app" to be running on one of the user's devices, since the system utilizes existing UUID data that is broadcast from the mobile devices. Thus, as can now be appreciated, disclosed embodiments provide methods and systems for conveniently tracking (in real-time) the location of users within a venue.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method comprising:
performing, in response to a user entering a first checkpoint, a user registration process to register the user for tracking;
wirelessly detecting a first unique identifier from a first mobile device in proximity to the user;
wirelessly detecting a second unique identifier from a second mobile device;
associating the user and the first unique identifier with one another;
adding the first unique identifier to a tracking list;
tracking a location of the first mobile device within the venue;
tracking a location of the second mobile device within the venue;
computing an association score based on:
the tracking of the location of the first mobile device and the tracking the location of the second mobile device, and
a number of unique identifiers associated with the user;
determining a confidence level for a probability that the user is at a particular location based on the association score; and
removing the first unique identifier from the tracking list in response to the user passing through a second checkpoint.

2. The computer-implemented method of claim 1, wherein wirelessly detecting the first unique identifier and wirelessly detecting the second unique identifier each comprises detecting Ethernet MAC addresses.

3. The computer-implemented method of claim 1, wherein wirelessly detecting the first unique identifier and wirelessly detecting the second unique identifier each comprises detecting Bluetooth addresses.

4. The computer-implemented method of claim 1, wherein wirelessly detecting the first unique identifier and wirelessly detecting the second unique identifier each comprises detecting UUIDs from a Bluetooth Low Energy beacon.

5. The computer-implemented method of claim 1, wherein the first mobile device is a smartphone.

6. The computer-implemented method of claim 1, wherein the first mobile device is a wearable fitness monitor.

7. A device comprising:
a processor;
a memory coupled to the processor;
a network interface coupled to the processor;
wherein the memory contains instructions, which when executed by the processor, perform the steps of:
performing, in response to a user entering a first checkpoint, a user registration process to register the user for tracking;
wirelessly detecting a first unique identifier from a first mobile device in proximity to the user;
wirelessly detecting a second unique identifier from a second mobile device;
associating the user and the first unique identifier with one another;
adding the first unique identifier to a tracking list;
tracking a location of the first mobile device within the venue;
tracking a location of the second mobile device within the venue;
computing an association score based on:
the tracking of the location of the first mobile device and the tracking the location of the second mobile device, and
a number of unique identifiers associated with the user;
determining a confidence level for a probability that the user is at a particular location based on the association score; and
removing the first unique identifier from the tracking list in response to the user passing through a second checkpoint.

8. The device of claim 7, wherein wirelessly detecting the first unique identifier and wirelessly detecting the second unique identifier each comprises detecting Ethernet MAC addresses.

9. The device of claim 7, wherein wirelessly detecting the first unique identifier and wirelessly detecting the second unique identifier each comprises detecting Bluetooth addresses.

10. The device of claim 7, wherein wirelessly detecting the first unique identifier and wirelessly detecting the second unique identifier each comprises detecting UUIDs from a Bluetooth Low Energy beacon.

11. The device of claim 7, wherein the first mobile device is a smartphone.

12. The device of claim 7, wherein the first mobile device is a wearable fitness monitor.

13. A computer program product for an electronic device for automatic tracking of a user within a venue, comprising a computer readable storage medium having program instructions embodied therewith, the program instructions executable by a processor to cause the electronic device to:

perform, in response to a user entering a first checkpoint, a user registration process to register the user for tracking;

wirelessly detect a first unique identifier from a first mobile device in proximity to the user;

wirelessly detect a second unique identifier from a second mobile device;

associate the user and the first unique identifier with one another;

add the first unique identifier to a tracking list;

track a location of the first mobile device within the venue;

track a location of the second mobile device within the venue;

compute an association score based on:

the tracking of the location of the first mobile device and the tracking the location of the second mobile device, and a number of unique identifiers associated with the user;

determine a confidence level for a probability that the user is at a particular location based on the association score; and remove the first unique identifier from the tracking list in response to the user passing through a second checkpoint.

14. The computer program product of claim 13, wherein wirelessly detecting the first unique identifier and wirelessly detecting the second unique identifier each comprises detecting Ethernet MAC addresses.

15. The computer program product of claim 13, wherein wirelessly detecting the first unique identifier and wirelessly detecting the second unique identifier each comprises detecting Bluetooth addresses.

16. The computer program product of claim 13, wherein wirelessly detecting the first unique identifier and wirelessly detecting the second unique identifier each comprises detecting UUIDs from a Bluetooth Low Energy beacon.

17. The computer program product of claim 13, wherein the first mobile device is a smartphone or a wearable fitness monitor.

* * * * *